Sept. 17, 1957 R. HUHN ET AL 2,806,697
FREE CARRIAGE ROUNDABOUT
Filed Jan. 9, 1953 3 Sheets-Sheet 1
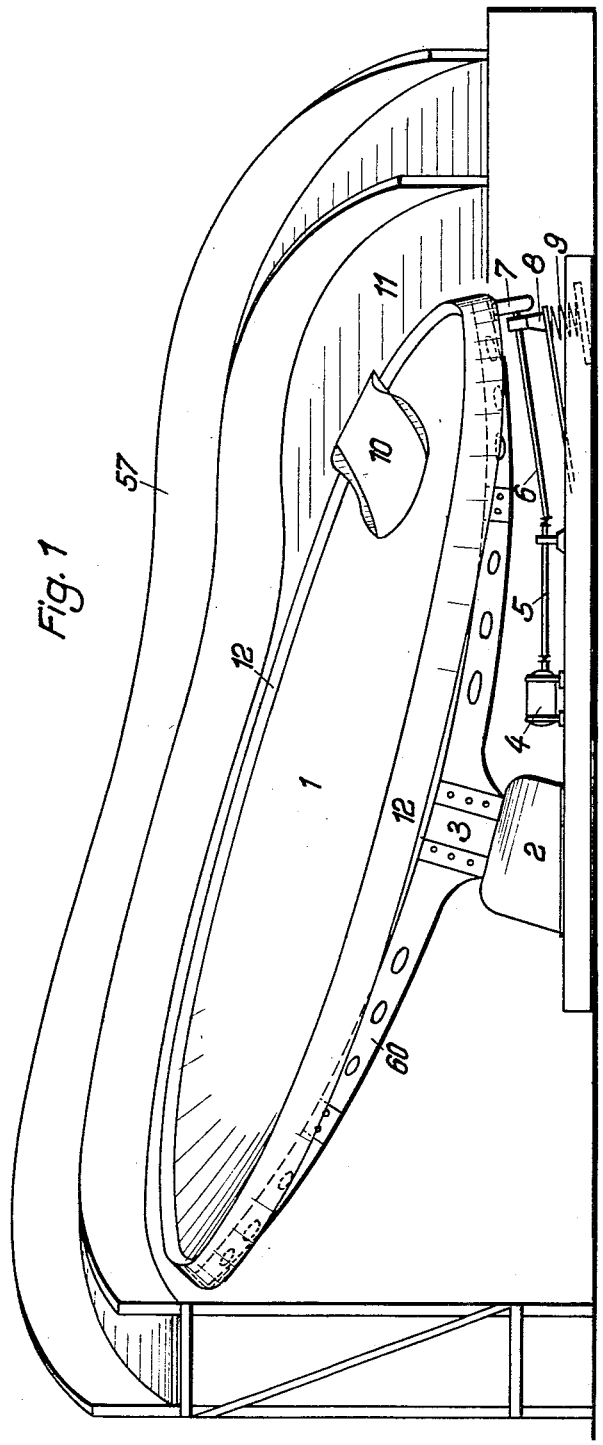
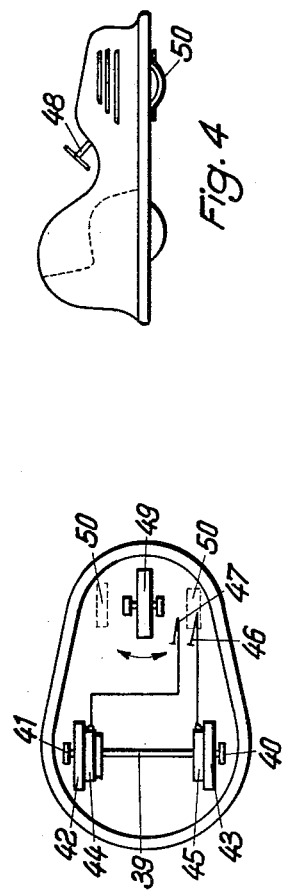
Inventors:
ROBERT HUHN AND
GEORG GAMROTH
BY:

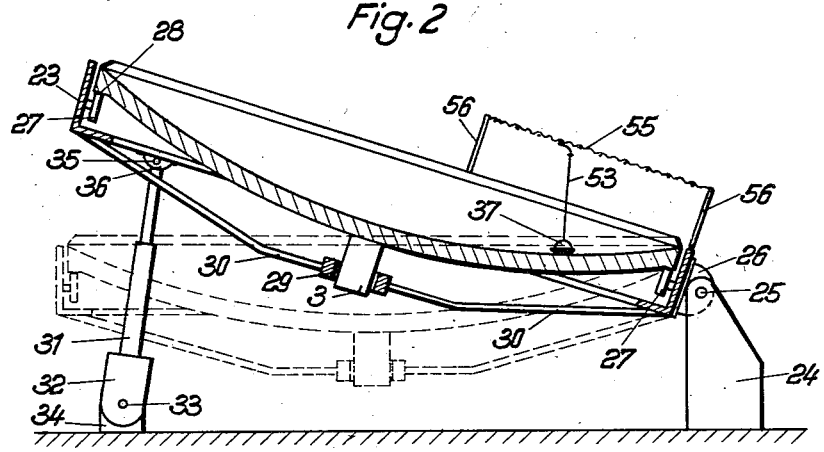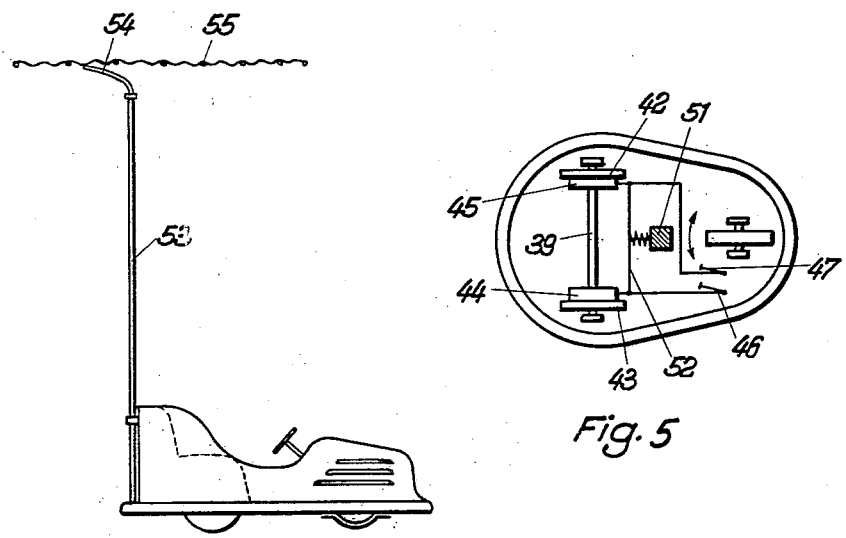

Sept. 17, 1957  R. HUHN ET AL  2,806,697
FREE CARRIAGE ROUNDABOUT
Filed Jan. 9, 1953  3 Sheets-Sheet 3
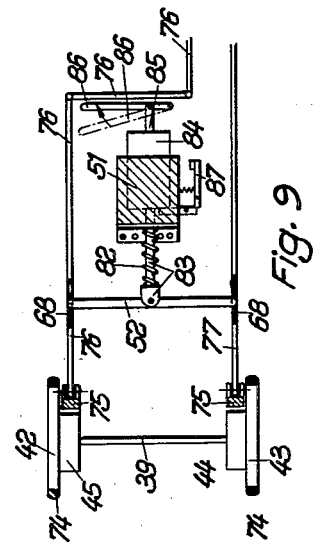
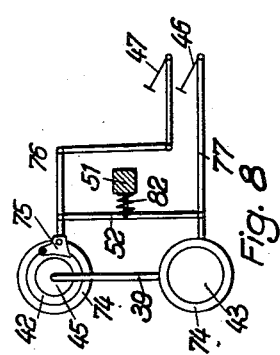
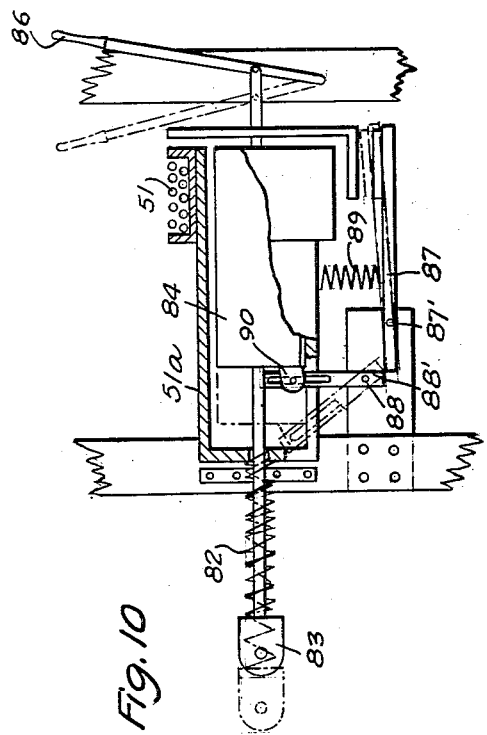
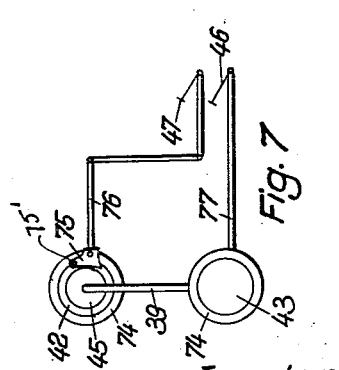
Inventors
ROBERT HUHN AND
GEORG GAMROTH
BY

2,806,697

FREE CARRIAGE ROUNDABOUT

Robert Huhn and Georg Gamroth, Cuxhaven, Germany

Application January 9, 1953, Serial No. 330,382

2 Claims. (Cl. 272—35)

The present invention relates to an amusement apparatus.

More particularly, the present invention relates to an amusement apparatus of the type where small vehicles simulating automobiles are located on a platform.

One of the objects of the present invention is to provide a vehicle-carrying platform, of an amusement apparatus, with a means for having vehicles thereon located at different elevations.

Another object of the present invention is to provide a vehicle-carrying platform capable of automatically locating vehicles thereon at a predetermined part of the platform when the vehicles are uncontrolled.

An additional object of the present invention is to provide a vehicle for an amusement apparatus with a foot brake means to prevent movement of the vehicle with respect to a platform on which it is located.

Still another object of the present invention is to provide a vehicle for an amusement apparatus with a means for braking the same independently of the operation of the vehicle by the occupant thereof.

A still additional object of the present invention is to provide a vehicle for an amusement apparatus with an operating means to release a brake structure which is operable independently of the operation of the vehicle by the occupant thereof.

With the above objects in view, the present invention mainly consists of an amusement apparatus which includes a stationary support means and a substantially dish-shaped platform having a central portion rising upwardly to the outer periphery thereof, this platform being mounted on the support means for rotation about an axis passing through the central portion of the platform and being inclined to vertical and horizontal planes passing through this axis, so that a vehicle on the platform may be braked to be carried to a top part of the platform upon rotation of the latter about the axis passing through the central portion thereof. This vehicle preferably includes a chassis carrying a front wheel and having a steering means for turning the front wheel. A rear axle is turnably mounted on the chassis and has a first rear wheel fixed thereto for rotation therewith and a second rear wheel freely mounted on the rear axle for rotation with respect to the same. A pair of brake drums are respectively fixed to the rear wheels, and a foot brake means is movably mounted on the chassis and operatively connected to the brake drums for releasably engaging the same to releasably brake the vehicle.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is an elevational view of one possible structure for carrying out the present invention, a part of this structure being unillustrated for the sake of clarity;

Fig. 2 is an elevational, partly sectional view, of still another embodiment of the present invention;

Fig. 3 is a diagrammatic view of the braking structure of a vehicle constructed in accordance with the present invention;

Fig. 4 is a side view of the vehicle of Fig. 3;

Fig. 5 is a diagrammatic view of an electrically operable braking apparatus of a vehicle constructed in accordance with the present invention;

Fig. 6 is a side, diagrammatic view of the vehicle of Fig. 5 illustrating how electricity is supplied to the same;

Fig. 7 is a diagrammatic view of the braking and steering structure of a vehicle constructed in accordance with the present invention;

Fig. 8 is a diagrammatic view of another embodiment of a braking structure constructed in accordance with the present invention;

Fig. 9 is a diagrammatic view of an electrically operable braking structure of a vehicle constructed in accordance with the present invention; and Fig. 10 is a fragmentary, diagrammatic view, on an enlarged scale, of a part of the structure of Fig. 9.

According to the embodiment of the invention which is illustrated in Fig. 1, the vehicle-carrying platform 1 is in the form of a dish-shaped structure having a shaft 3 connected to the center thereof and extending downwardly therefrom, this shaft 3 being turnably mounted on a rigid stationary bearing 2 for rotation about an axis which is inclined at a constant angle to the vertical, and the turning axis of shaft 3 being coincident with its own axis and passing through a central part of platform 1. Beneath the turnable platform 1 there is located a motor 4 which may be of a relatively small size and which turns a shaft 5 connected by a universal joint to a shaft 6 so that the latter shaft is driven by the motor 4. The shaft 6 carries at its outer end the friction wheel 7 which drives the platform 1. This friction wheel 7, which may be provided with a rubber rim engages the underside of platform 1 so that the friction between wheel 7 and the platform 1 causes the rotation of wheel 7 to turn the platform 1 about the inclined axis of shaft 3. The bearing block 8, which turnably supports the shaft 6, is under the influence of a spring 9, as is diagrammatically illustrated in Fig. 1, this spring 9 urging the bearing block 8 and the shaft 6 therewith upwardly so as to press the friction wheel 7 toward the underside of platform 1 and into engagement with it. The drive for rotating the platform 1 may take forms other than that shown in Fig. 1, such as, for example, any suitable belt, chain, or cable drive or through a rigid shaft and suitable couplings.

As is shown in Fig. 1, the platform 1 is at least partly surrounded by a stationary platform 11 which turnably supports a bridge member 10, similar to a gang plank, to support the bridge 10 for turning movement to and from the position of Fig. 1 where the member 10 is located over a part of platform 1. With the bridge member 10 in the operative position of Fig. 1, it is possible for vehicles to be rolled from the platform 11 over the bridge 10 onto the platform 1. Thus, the bridge 10 provides a means for removing empty vehicles from the platform 1 or providing extra vehicles thereon so that there are never any vehicles on the platform 1 which are without occupants. The bridge 10 is only used while the platform 1 is stationary, and during operation of the latter the bridge 10 is turned back to its inoperative position over and on top of the platform 11 so that it is completely clear of the turning platform 1. The platform 11 may extend all around the platform 1 or only about the lowest portion of platform 1.

A gallery 57 may be located about the platform 11 and platform 1, as shown in Fig. 1, to accommodate spectators.

In order to provide absolute safety against movement of vehicles from the platform 1 during rotation thereof, the platform 1, has an annular wall 12 fixed to its periphery to provide a guard rail or bumper wall which keeps the vehicles on the platform.

Fig. 2 of the drawings illustrates a further embodiment of the invention where the turning platform is adjustably mounted. As is shown in Fig. 2, the platform 1, which is also dish-shaped in the embodiment of Fig. 2, is located within an annular ring member 23 which supports the platform 1. The ring 23 is supported on one side thereof by a rigid column 24 which carries a pin 25 extending through a lug 26 fixed to the ring 23 so that the latter is tiltable about the horizontal axis of pin 25. The ring 23 turnably carries on its inner side surface rollers 27 which are suitably spaced from each other and distributed about the ring 23. The platform 1 is provided with a lower annular peripheral surface portion 28 which engages the rollers 27 so that the platform 1 turns on these rollers within the ring 23. The shaft 3 is turnable within a bearing 29 located at the center of ring 23 and being fixedly carried by the struts 30 which extend substantially radially toward the center of ring 23 from the outer periphery thereof to which the struts 30 are fixed, only two of these struts 30 being shown in Fig. 2. Any suitable number of struts 30 may be provided, and, as is apparent from Fig. 2, the struts 30 are fixed to a lower annular part of ring 23, and may be formed integrally with the ring 23, if desired, so as to form a unit therewith. As is schematically shown in Fig. 2, a lifting apparatus is provided which in the illustrated example is in the form of telescoped members 31 and 32, the members 31 being pivotally connected by a pin 35 to a lug 36 fixed to the ring 23, and the member 32 being pivotally connected by a pin 33 to the stationary rigid block 34. These members 31 and 32 may, for example, be in the form of threaded telescoped members so that when the intermediate member 31 of Fig. 2 is turned in one direction it moves outwardly from the member 32 and causes the topmost member 31, which is pivotally connected to lug 36, to move outwardly of the intermediate member 31, and when the latter is turned in an opposite direction, these members move into each other to lower the platform to the dotted line position shown in Fig. 2. Any suitable means may be provided to turn the intermediate member 31. The lifting apparatus may also be in the form of a hydraulic cylinder and piston turnably connected to the pivot pins 33 and 35, respectively, or any suitable spindle driven or chain driven lifting apparatus may be used.

The drive for the platform of Fig. 2 is not illustrated but may take the form of the drive means illustrated in Fig. 1 and described above, so that the spring 9 may expand and contract during a change in the inclination of the platform to maintain the friction wheel 7 against the rail 58. Any other suitable drive means may be used with the structure of Fig. 2.

The apparatus of Fig. 2 is located in the horizontal, dotted-line position shown in Fig. 2 when the apparatus is in its rest position, and the apparatus may be tilted before or at the beginning of the rotation of platform 1 to the solid line position of Fig. 2. When the rotation of the platform is stopped, it is again lowered to the horizontal position, and the vehicles 37 on the platform then gather at the center of the latter.

The vehicles adapted to be used with the above-described structure are shown in Figs. 3–6, these vehicles having no independent drive means and the vehicle of Figs. 3 and 4 having footbrakes while the vehicle of Figs. 5 and 6 have foot and electrically operable brakes.

The vehicle of Figs. 3 and 4 is provided with a rear axle 39 turnably carried by the bearings 40 and 41 fixed to the chassis of the vehicle. One rear wheel 42 is fixed to the axle 39 for rotation therewith, as by being shrunk onto the axle 39, while the other rear wheel 43 is freely turnable on the axle 39. Both wheels are provided with brake drums 44 and 45, respectively, and can be independently braked by the pedals 46 and 47 through the linkages diagrammatically shown in Fig. 3. The front wheel 49 is turnable in the direction of the arrows of Fig. 3 through the medium of the steering column 48, shown in Fig. 4. Also, resilient supporting members 50 are provided on the underside of the vehicle to contact the platform 1 only when the vehicle turns too far to one side or the other side, so as to stabilize the vehicle, but if desired these members 50 may be omitted.

Instead of one of the rear wheels being fixed to the rear axle, both of the rear wheels may be freely turnable thereon.

In the embodiment of Figs. 5 and 6, the wheels 42 and 43 are both freely turnable on the rear axle 39, and the brakes respectively associated with these wheels are independently operable by the foot pedals 46 and 47.

Fig. 7 schematically illustrates the braking and linkage system for the vehicle of Figs. 3 and 4. The freely turnable wheels 42 and 43 carry rubber tires 74 and the brake drums 44 and 45, respectively. Brake shoes 75 are respectively located next to these brake drums, these brake shoes 75 being pivotally suspended from the underside of the chassis at the top part 75' of the brake shoes. Suitable springs are connected to the pedals 46 and 47 to urge the same upwardly, and a rigid bar 77 extends from the pedal 46 and is fixed to one of the brake shoes 75, while a substantially S-shaped rigid member 76 extends from the pedal 47 and is fixed to the brake shoe 75. Thus, when either of the pedals are depressed, the brake shoe associated therewith turns about its pivot 75' into engagement with the brake drum associated therewith to prevent rotation of one of the wheels, and when the pedals are released the springs connected thereto automatically raise them and move the brake shoes away from the drums so as to release the vehicle for free movement on the platform 1.

Figs. 8 to 10 show an electromagnetic brake operating apparatus for braking the rear wheels of the vehicle independently of the operation of the foot brake so as to prevent the vehicles from moving at too great a speed and so as to render the entrance and exit of the occupants to and from the vehicles absolutely safe. The electromagnetic apparatus is in the form of an electromagnet 51a having an electromagnet coil 51, which is located adjacent a rod 52 (Figs. 8 and 9) connected to the linkages 76 and 77 for the brake shoes 75. The current is supplied to the coil 51 through the medium of an electrically conductive rod 53 carried by the vehicle and having a top, springy contact end 54 (Figs. 2 and 6) which slides along the current-carrying net 55 arranged at a suitable height over half of the platform 1. The net 55 may be stretched across rods 56 fixed to the ring 23 outside of the platform 1, as is shown in Fig. 2. The rod 52, as is evident from Fig. 9, carries at its opposite ends a pair of pins, respectively, which are located within slots 68 formed in the linkages 76 and 77 so that the rod 52 is movable with respect to these linkages, the rod 52 being connected at its center to the bar 83 which is under the influence of spring 82. This spring abuts against an end of coil 51 and a shoulder on bar 83 to urge the latter to the left, as viewed in Fig. 9. The bar 83 is connected to a guide member 84 movable with respect to the coil 51, and this member 84 is pivotally connected by lug 85 to the operating lever 86 which is manually operable and accessible in the interior of the vehicle. The mechanism for releasing the brake shoes 75 to the influence of spring 82 is in the form of a spring-pressed member 87 pivotally mounted at 87' on the chassis of the vehicle and the catch member 88 pivotally mounted at 88' on the chassis of the vehicle and having a slot in which a pin 90, fixed to guide member 84, is located.

When the coil 51 is energized, by a switch located away from the apparatus and accessible to an attendant, the member 87 is attracted and pivoted about pivot pin 87' to the dotted line position shown in Fig. 10. As is apparent from the solid line position of members 87 and 88 shown in Fig. 10, the member 84 cannot move to the left under the influence of spring 82 because the member 88 abuts against the left end of member 87 and cannot turn. However, when the member 87 is turned by energizing of coil 51 to the dotted line position of Fig. 10, against the action of the spring connected to member 87, then the member 88 is free to turn to the dotted line position of Fig. 18 about pivot 88', and the spring 82 is therefore freed so that it moves member 52 to the left end of slots 68, as viewed in Fig. 9, and then moves the member 52 and the linkages 76 and 77 further to the left to engage the brake drums on the rear wheels to prevent turning of the latter, the lever 86 moving to the dotted line position shown in Fig. 9. The parts will remain in this braking position, under the influence of spring 82, after the coil 51 is unenergized, and, after an occupant enters the vehicle, he need only move the lever 86 back to the solid line position of Fig. 9, in the direction of the arrow shown therein, to release the brakes and render them again operable by the foot pedals, the pins at the ends of rod 52 being located in the approximate centers of slot 68 when the brakes are released. When the coil 51 is unenergized, the spring 89 connected to member 87 moves it back to the solid line position of Fig. 10, and when lever 86 is moved back to the solid line position of Fig. 9, the member 84 moves to the right, as viewed in Fig. 10, and this causes the pin 90, connected to the member 84, to turn the member 88 to the solid line position of Fig. 10 so that it snaps over the left end of member 87 and becomes caught thereby to hold the automatic braking apparatus against the action of spring 82 until the electromagnet 51 is again energized.

The electromagnetic automatic braking apparatus finds its greatest utility with those turning platforms which are constantly inclined. The vehicles may be electrically braked when they arrive at the lowermost part of the platform, as shown in Fig. 2, and it is only necessary for the occupant of a vehicle to actuate the lever 86 to release the brakes, as was described above.

The above described apparatus operates as follows:

Empty vehicles which are located on the platform 11 are rolled onto the platform 1 over the bridge or gang plank 10, and any empty vehicles on the platform 1 are moved therefrom. Then the bridge member 10 is turned away from the platform 1, and the rotation of the platform is started. In the case of the tiltable platform shown in Fig. 2, the platform is tilted either before or at the beginning of the rotation to the inclined position shown in solid lines in Fig. 2.

As long as the occupants of the vehicle do not apply the brakes, the vehicles are not carried along with the platform. However, when the brakes are applied the vehicles cannot roll with respect to the platform and they are therefore taken along in the rotary movement of the platform so that the vehicles are carried to the topmost part of the platform. When the vehicles are in the latter location, the occupants thereof release the brakes and the vehicles then roll down the rotating platform along any desired curves in accordance with the manner in which the vehicles are steered. Thus, the occupants of the vehicles can travel through any desired paths up and down the platform. Sirens or any other apparatus for making special sound effects may be built into each vehicle, and these sound producing devices may be turned on or off during the movement of the disc. These noise effects plus the increasing speed of rotation of the disc heighten the amusement of the participants.

When a rotating platform of the type shown in Fig. 1 stops rotating, all of the vehicles roll to the lowest part of the platform where they gather together. Where the rotating platform is of the tiltable type, the vehicles 37, upon stopping of the rotation of the platform and return thereof to the horizontal position, roll to the center of the platform where they gather together, and the vehicles simultaneously move to the center of the platform as the rotating speed of the latter reduces.

When the platform has stopped turning, the occupants of the vehicles may leave them without any difficulty and may leave the platform over the bridge member 10, and then the above cycle is repeated.

It will be understood that each of the elements described above, or two or more together, may also find a useful application in other types of amusement apparatus differing from the types described above.

While the invention has been illustrated and described as embodied in a rotating amusement apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Amusement apparatus comprising, in combination, stationary support means; a substantially dish-shaped platform having a top concave face and being mounted on said support means for rotation about an axis passing through a central portion of said platform and being inclined to vertical and horizontal planes passing through said axis, so that a vehicle on said platform may be braked to be carried to a top part of said platform upon rotation of the latter about said axis; a stationary electrically conductive net mounted above said platform at a predetermined height over a lowermost portion thereof; a vehicle located on said platform and having a least three wheels; releasable brake means operatively connected to at least two of said wheels and being movable between a braking and a releasing position; spring means operatively connected to said brake means for urging the same into the braking position thereof; releasable catch means connected to said brake means to hold the same against the action of said spring means in the released position thereof; and electrical moving means operatively connected to said catch means for actuating the same to release said brake means to the action of said spring means, said electrical moving means including an electrically conductive member extending upwardly from said vehicle and engaging said net when said vehicle is on said lowermost portion of said platform.

2. Amusement apparatus comprising, in combination, stationary support means; a substantially dish-shaped platform having a top concave face and being mounted on said support means for rotation about an axis passing through a central portion of said platform and being inclined to vertical and horizontal planes passing through said axis, so that a vehicle on said platform may be braked to be carried to a top part of said platform upon rotation of the latter about said axis; a stationary electrically conductive net mounted above said platform at a predetermined height over a lowermost portion thereof; a vehicle located on said platform and having at least three wheels; releasable brake means operatively connected to at least two of said wheels and being movable between a braking and a releasing position; spring means operatively connected to said brake means for urging the same into the braking position thereof; releasable catch means connected to said brake means to hold the same against the action of said spring means in the released position thereof; electrical moving means operatively connected to said catch means for actuating the same to release said brake means to the action of said spring means, said electrical moving means including an electrically conductive member extending upwardly from said vehicle and engaging said net when said vehicle is on said lowermost portion of said platform; and manually operable lever means located on said vehicle and being operatively connected to said brake means to move the latter against the action of said spring means to said release position of said brake means.

References Cited in the file of this patent

UNITED STATES PATENTS

| | | |
|---|---|---|
| 331,419 | Marzari | Dec. 1, 1885 |
| 1,409,071 | Veaux et al. | Mar. 7, 1922 |
| 1,432,224 | Welsh | Oct. 17, 1922 |
| 1,652,840 | Stoehrer | Dec. 13, 1927 |
| 1,799,409 | Custer | Apr. 7, 1931 |
| 2,225,411 | Feltman | Dec. 17, 1940 |